United States Patent
Ratasuk et al.

(10) Patent No.: US 11,502,892 B2
(45) Date of Patent: Nov. 15, 2022

(54) MODULATION ADJUSTMENT FOR 16-QAM IN NARROWBAND IOT

(71) Applicant: Nokia Technologies Oy, Espoo (FI)

(72) Inventors: Rapeepat Ratasuk, Inverness, IL (US); Nitin Mangalvedhe, Hoffman Estates, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/231,202

(22) Filed: Apr. 15, 2021

(65) Prior Publication Data

US 2021/0336836 A1    Oct. 28, 2021

Related U.S. Application Data (60) Provisional application No. 63/013,838, filed on Apr. 22, 2020.

(51) Int. Cl.
*H04L 27/34* (2006.01)
*H04W 72/04* (2009.01)
*H04L 1/00* (2006.01)

(52) U.S. Cl.
CPC ........ *H04L 27/3405* (2013.01); *H04L 1/0003* (2013.01); *H04W 72/042* (2013.01)

(58) Field of Classification Search
CPC . H04L 27/3405; H04L 1/0003; H04W 72/042
See application file for complete search history.

(56) References Cited

U.S. PATENT DOCUMENTS 10,484,971 B2 * 11/2019 Kim .................... H04W 72/042
11,108,614 B2 *  8/2021 Behravan ............ H04L 27/0008
(Continued)

FOREIGN PATENT DOCUMENTS

WO    2018/085666 A1    5/2018
WO    2019/032676 A1    2/2019

OTHER PUBLICATIONS

"New WID on Rel-17 Enhancements for NB-IoT and LTE-MTC", 3GPP TSG RAN Meeting #86, RP-193264, Agenda : 10.1.1, Huawei, Dec. 9-12, 2019, 5 pages.
(Continued)

*Primary Examiner* — Janice N Tieu
(74) *Attorney, Agent, or Firm* — Squire Patton Boggs (US) LLP (57) ABSTRACT

Techniques of defining a transmission scheme for NB-IoT data include determining the TBS based on 16-quadrature amplitude modulation (QAM) analysis but use quadrature phase-shift keying (QPSK) for modulation. For example, a base station (eNB) may determine that a UE is configured to receive or transmit data with 16-QAM modulation via capability signalling from the UE. Upon performing this determination, the eNB transmits configuration data to the UE, e.g., via DCI, configuring the UE to receive data over a narrowband physical downlink shared channel (NPDSCH) using 16-QAM modulation. Part of the configuration data indicates whether the UE is to support 16-QAM modulation with or without repetition via radio resource control (RRC) parameter modulation-restriction-Repetitions. Depending upon this indication, the UE may use quadrature phase-shift keying (QPSK) rather than 16-QAM despite selecting or being assigned a TBS based on 16-QAM modulation.

12 Claims, 8 Drawing Sheets

(56) References Cited

U.S. PATENT DOCUMENTS

2010/0074195 A1    3/2010  Cheng et al.
2010/0208635 A1    8/2010  Frederiksen et al.
2018/0323940 A1*  11/2018  Rico Alvarino ...... H04L 1/0016
2020/0022141 A1    1/2020  Kang et al.

OTHER PUBLICATIONS

"Support of 16QAM in NB-IoT", 3GPP TSG RAN WG1 Meeting #97, R1-1906654, Agenda : 6.2.2.7, MediaTek Inc., May 13-17, 2019, 4 pages.
"Simulation Methodology for EUTRA Uplink: SC-FDMA and OFDMA", 3GPP TSG-RAN WG1 Meeting #43, Tdoc R1-051352, Agenda : 8.4, Samsung, Nov. 7-11, 2005, 8 pages.
"3rd Generation Partnership Project;Technical Specification Group Radio Access Network;Evolved Universal Terrestrial Radio Access (E-UTRA);Multiplexing and channel coding (Release 16)", 3GPP TS 36.212, V16.0.0, Dec. 2019, pp. 1-250.
"3rd Generation Partnership Project;Technical Specification Group Radio Access Network;Evolved Universal Terrestrial Radio Access (E-UTRA);Physical layer procedures(Release 16)", 3GPP TS 36.213, V16.0.0, Dec. 2019, pp. 1-568.
"Support of 16-QAM for NB-IoT", 3GPP TSG RAN WG1 Meeting #101, R1-20xxxxx, Agenda : 8.9.1, Nokia, May 25-29, 2020, 7 pages.
Raftopoulou, "Design and Assessment of Random Access Procedures Supporting Massive Connectivity and Low-delay and High-reliability Services in 5G", Thesis, Sep. 20, 2018, 119 pages.
"Selectable QPSK or 16QAM Modulation", RFMW, Retrieved on Mar. 5, 2021, Webpage available at : http:/rfmw.em.keysight.com/wireless/helpfiles/opt419/qpsk_or_16qam_modulation_tech_over.htm.

* cited by examiner

MODULATION ADJUSTMENT FOR 16-QAM IN NARROWBAND IOT

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's LTE upgrade path for mobile networks. In LTE, base stations or access points (APs), which are referred to as enhanced Node AP (eNBs), provide wireless access within a coverage area or cell. In LTE, mobile devices, or mobile stations are referred to as user equipment (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, e.g., above 6 GHz. For fifth generation wireless systems (5G), an access architecture for deployment of cellular radio equipment employing mmWave radio spectrum has been proposed. Other example spectrums may also be used, such as cmWave radio spectrum (e.g., 3-30 GHz).

SUMMARY

According to an example implementation, a method includes receiving, by a user equipment (UE), configuration data indicating that the UE is configured to use 16-quadrature amplitude modulation (QAM) modulation; and communicating, by the UE, data over a physical shared channel using a quadrature phase-shift keying (QPSK) modulation with a transport block size (TBS) selected from a TBS table based on an indicated modulation and coding scheme (MCS) index corresponding to 16-QAM modulation.

According to an example implementation, an apparatus includes at least processor and at least one memory including computer program code, the at least one memory and the computer program code configured to, with the at least one processor, cause the apparatus at least to receive configuration data indicating that the apparatus is configured to use 16-quadrature amplitude modulation (QAM) modulation; and communicate data over a physical shared channel using a quadrature phase-shift keying (QPSK) modulation with a transport block size (TBS) selected from a TBS table based on an indicated modulation and coding scheme (MCS) index corresponding to 16-QAM modulation.

According to an example implementation, an apparatus includes means for configuration data indicating that the UE is configured to use 16-quadrature amplitude modulation (QAM) modulation; and means for communicating data over a physical shared channel using a quadrature phase-shift keying (QPSK) modulation with a transport block size (TBS) selected from a TBS table based on an indicated modulation and coding scheme (MCS) index corresponding to 16-QAM modulation.

According to an example implementation, a computer program product includes a computer-readable storage medium and storing executable code that, when executed by at least one data processing apparatus, is configured to cause the at least one data processing apparatus to receive configuration data indicating that the apparatus is configured to use 16-quadrature amplitude modulation (QAM) modulation; and communicate data over a physical shared channel using a quadrature phase-shift keying (QPSK) modulation with a transport block size (TBS) selected from a TBS table based on an indicated modulation and coding scheme (MCS) index corresponding to 16-QAM modulation.

According to an example implementation, a method includes transmitting, by the base station, a signal that includes configuration data indicating that the UE is configured to use 16-quadrature amplitude modulation (QAM) modulation, the signal being configured to cause the UE to communicate data over a physical shared channel using a quadrature phase-shift keying (QPSK) modulation with a transport block size (TBS) selected from a TBS table based on an indicated modulation and coding scheme (MCS) index corresponding to 16-QAM modulation.

According to an example implementation, an apparatus includes at least processor and at least one memory including computer program code, the at least one memory and the computer program code configured to, with the at least one processor, cause the apparatus at least to transmit a signal that includes configuration data indicating that the UE is configured to use 16-quadrature amplitude modulation (QAM) modulation, the signal being configured to cause the UE to communicate data over a physical shared channel using a quadrature phase-shift keying (QPSK) modulation with a transport block size (TBS) selected from a TBS table based on an indicated modulation and coding scheme (MCS) index corresponding to 16-QAM modulation.

According to an example implementation, an apparatus includes means for transmitting a signal that includes configuration data indicating that the UE is configured to use 16-quadrature amplitude modulation (QAM) modulation, the signal being configured to cause the UE to communicate data over a physical shared channel using a quadrature phase-shift keying (QPSK) modulation with a transport block size (TBS) selected from a TBS table based on an indicated modulation and coding scheme (MCS) index corresponding to 16-QAM modulation.

According to an example implementation, a computer program product includes a computer-readable storage medium and storing executable code that, when executed by at least one data processing apparatus, is configured to cause the at least one data processing apparatus to transmit a signal that includes configuration data indicating that the UE is configured to use 16-quadrature amplitude modulation (QAM) modulation, the signal being configured to cause the UE to communicate data over the physical shared channel using a quadrature phase-shift keying (QPSK) modulation with a transport block size (TBS) selected from a TBS table based on an indicated modulation and coding scheme (MCS) index corresponding to 16-QAM modulation.

The details of one or more examples of implementations are set forth in the accompanying drawings and the description below. Other features will be apparent from the description and drawings, and from the claims.

DETAILED DESCRIPTION

Figure 1:
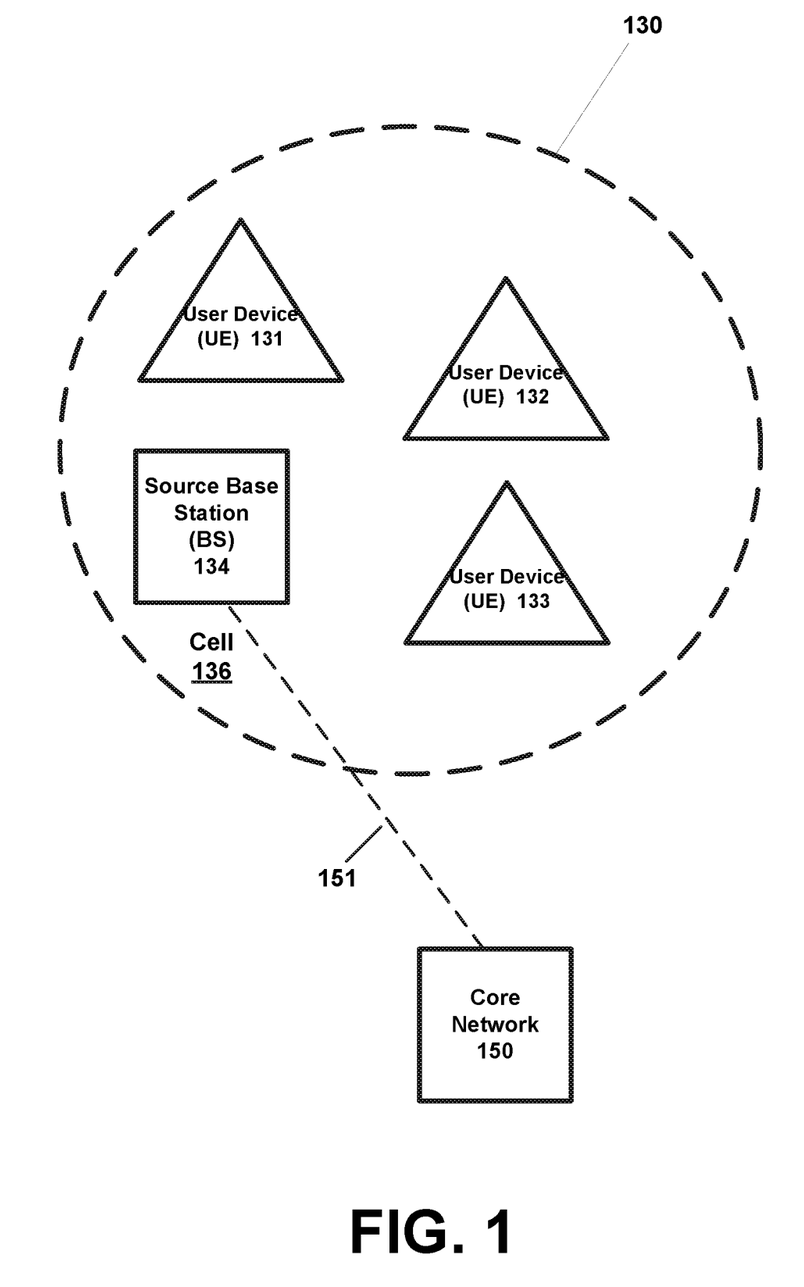
FIG. 1 is a block diagram of a digital communications network according to an example implementation.

FIG. 1 is a block diagram of a digital communications system such as a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB (which may be a 5G base station) or a network node. At least part of the functionalities of an access point (AP), base station (BS) or (e)Node B (eNB) may be also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via an interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies, wireless networks, such as LTE, LTE-A, 5G (New Radio, or NR), cmWave, and/or mmWave band networks, or any other wireless network or use case. LTE, 5G, cmWave and mmWave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IoT), time-sensitive communications (TSC), enhanced mobile broadband (eMBB), massive machine type communications (MMTC), vehicle-to-vehicle (V2V), vehicle-to-device, etc. Each of these use cases, or types of UEs, may have its own set of requirements.

Narrowband Internet of Things (NB-IoT) is a standard for LTE directed to the connection of low-power equipment such as water and other industrial sensors. Such devices typically rely on batteries and send small amounts of information. Accordingly, NB-IoT is designed for low speed but long reach.

In Rel-17 of the 3GPP, regarding IoT enhancements, an objective is to specify 16-quadrature amplitude modulation (QAM) support for NB-IoT as follows. 16-QAM is specified for unicast in uplink (UL) and downlink (DL), including necessary changes to DL power allocation for narrowband physical downlink shared channel (NPDSCH) and DL transport block size (TBS). This is to be specified without a new NB-IoT UE category. For DL, there is an increase in maximum TBS of e.g. 2× the Rel-16 maximum, and a soft buffer size will be specified by modifying at least existing Category NB2. For UL, the maximum TBS is not increased. The NB-IoT channel quality reporting is extended based on the framework of Rel-14 to 16, to support 16-QAM in DL.

The TBS for various modulation and coding schemes (MCS) and subframes (SF) is provided in the table below. Note that there are new entries in the table for TBS indices 14 to 21 corresponding to 16-QAM. The maximum TBS for 16-QAM increases from 2536 to 4968 bits.

TABLE 1

DL (NPDSCH) TBS table. 16-QAM entries correspond to TBS indices greater than or equal to 14.

| $I_{TBS}$ | $I_{SF}$ | | | | | | | |
|---|---|---|---|---|---|---|---|---|
| | 0 | 1 | 2 | 3 | 4 | 5 | 6 | 7 |
| 0 | 16 | 32 | 56 | 88 | 120 | 152 | 208 | 256 |
| 1 | 24 | 56 | 88 | 144 | 176 | 208 | 256 | 344 |
| 2 | 32 | 72 | 144 | 176 | 208 | 256 | 328 | 424 |
| 3 | 40 | 104 | 176 | 208 | 256 | 328 | 440 | 568 |
| 4 | 56 | 120 | 208 | 256 | 328 | 408 | 552 | 680 |
| 5 | 72 | 144 | 224 | 328 | 424 | 504 | 680 | 872 |
| 6 | 88 | 176 | 256 | 392 | 504 | 600 | 808 | 1032 |
| 7 | 104 | 224 | 328 | 472 | 584 | 680 | 968 | 1224 |
| 8 | 120 | 256 | 392 | 536 | 680 | 808 | 1096 | 1352 |
| 9 | 136 | 296 | 456 | 616 | 776 | 936 | 1256 | 1544 |
| 10 | 144 | 328 | 504 | 680 | 872 | 1032 | 1384 | 1736 |
| 11 | 176 | 376 | 584 | 776 | 1000 | 1192 | 1608 | 2024 |
| 12 | 208 | 440 | 680 | 904 | 1128 | 1352 | 1800 | 2280 |

TABLE 1-continued

DL (NPDSCH) TBS table. 16-QAM entries correspond to TBS indices greater than or equal to 14.

| | $I_{SF}$ | | | | | | | |
|---|---|---|---|---|---|---|---|---|
| $I_{TBS}$ | 0 | 1 | 2 | 3 | 4 | 5 | 6 | 7 |
| 13 | 224 | 488 | 744 | 1032 | 1256 | 1544 | 2024 | 2536 |
| 14 | 256 | 552 | 840 | 1128 | 1416 | 1736 | 2280 | 2856 |
| 15 | 280 | 600 | 904 | 1224 | 1544 | 1800 | 2472 | 3112 |
| 16 | 328 | 632 | 968 | 1288 | 1608 | 1928 | 2600 | 3240 |
| 17 | 336 | 696 | 1064 | 1416 | 1800 | 2152 | 2856 | 3624 |
| 18 | 376 | 776 | 1160 | 1544 | 1992 | 2344 | 3112 | 4008 |
| 19 | 408 | 840 | 1288 | 1736 | 2152 | 2600 | 3496 | 4264 |
| 20 | 440 | 904 | 1384 | 1864 | 2344 | 2792 | 3752 | 4584 |
| 21 | 488 | 1000 | 1480 | 1992 | 2472 | 2984 | 4008 | 4968 |

Conventional approaches to defining a transmission scheme for NB-IoT data is to provide 16-QAM modulation in each transmission of data to increase throughput. As disclosed above, the 16-QAM modulation corresponds to larger TBS indices and accordingly larger TBS. Nevertheless, such conventional approaches to defining a transmission scheme for NB-IoT data may not be optimal because 16-QAM is sensitive to noise. For example, an introduction of 16-QAM in NB-IoT may significantly increase the peak data rate (approximately 2 times) as well as throughput for UE. For UE, such an increase in data rate and throughput may not be in a good enough radio condition to be scheduled using 16-QAM because, e.g., the signal-to-noise ratio (SNR) may not be not high enough. Throughput can also be increased by scheduling 16-QAM modulation with repetition to take advantage of the higher supported TBS.

However, for the same spectral efficiency, 16-QAM requires higher SNR than QPSK to decode due to its sensitivity to noise and channel estimation error. Therefore, using 16-QAM with repetition is not always the optimal way to increase throughput of the UE.

Along these lines, dynamic scheduling may allow a scheduler (e.g., provided at a network node or BS/gNB) to frequently (e.g., each transmission time interval (TTI) or subframe) grant or allocate resources to a user device (or UE) for an uplink transmission or a downlink reception. Thus, for example, dynamic scheduling may allow a UE to receive grants every subframe or TTI. Each grant may be provided by a BS/gNB or network node to a UE in response to a request. Grants based on dynamic scheduling may be referred to as dynamic grants.

However, some services may require more frequent or periodic transmission or reception of data. Using a dynamic scheduling for these type of services or applications, for example, may create significant signaling overhead. In an example embodiment, a semi-persistent scheduling (SPS) may also be used in which a BS/gNB (or network node) may provide a configured grant for periodic resources for the UE. With configured grant (CG), or grant-free, scheduling, the BS or network node reserves resources for uplink transmission for the CG, and informs the UE(s) of the reserved resources. When a UE initiates a transmission via the CG, the UE uses the reserved resources of the CG without sending a scheduling request and waiting for a grant message from the network node or BS. In an illustrative example, for an uplink transmission, a configured grant type 1 or type 2 may be used for a configured grant, by way of illustrative example embodiments.

In an example embodiment of a configured grant type 1, an uplink grant is provided or communicated via radio resource control (RRC) signaling/message, including activation of the grant. In type 1 configured grant, by way of illustrative example, the transmission parameters of the configured grant, e.g., which may include periodicity, time offset, frequency resources (e.g., the time offset and the frequency resources may comprise the time-frequency resources of the configured grant), and modulation and coding scheme (MCS) for uplink transmissions, may be configured via RRC signaling. For example, upon receiving the RRC configuration of the configured grant, if there is data in the UE transmit buffer, the UE may start to use the configured grant for uplink transmission in the time instant indicated by the periodicity and the offset.

In an example embodiment of a configured grant type 2, by way of an illustrative example, RRC signaling may be used to configure the periodicity (or period) of the configured grant, while one or more other transmission parameters (e.g., frequency resources and/or MCS) of the configured grant may be provided or configured as part of the activation of the configured grant via layer 1/layer 2 (L1/L2) signaling, such as via downlink control information (DCI) and/or physical downlink control channel (PDCCH). For example, upon receiving the activation command via PDCCH, the UE may transmit according to the configured grant if there is data in the buffer for transmission. For both type 1 and type 2 configured grants, if there is no data in the buffer of the UE for transmission, then the UE does not transmit via the configured grant.

In contrast to the above-described approaches to defining a transmission scheme for NB IoT data, improved techniques include determining the TBS based on 16-QAM analysis but use quadrature phase-shift keying (QPSK) for modulation. For example, a base station (eNB or gNB) may determine that a UE is configured to transmit data with 16-QAM modulation via capability signaling from the UE. Upon performing this determination, the eNB transmits configuration data to the UE, e.g., via DCI, configuring the UE to communicate (e.g., receive and/or transmit) data over a narrowband physical downlink shared channel (NPDSCH) using 16-QAM modulation. Part of the configuration data indicates whether the UE is to support 16-QAM modulation only without repetition or also with repetition via radio resource control (RRC) parameter modulation-restriction-Repetitions. In some implementations, the RRC parameter modulation-restriction-Repetitions indicates whether fallback is used or not. Depending upon this RRC parameter, the UE may use quadrature phase-shift keying (QPSK) rather than 16-QAM despite selecting or being assigned a TBS based on 16-QAM modulation. For example, if the UE is configured with modulation-restriction-Repetitions and receives a DCI with (i) a modulation and coding scheme (MCS) field indicating 16-QAM modulation by specifying TBS index values greater than or equal to 14, and (ii) a repetition number field indicating repetition greater than one, then the UE will determine the TBS according to the assigned TBS index value but will use QPSK instead of 16-QAM modulation. Alternately, the radio resource control (RRC) parameter may indicate whether UE is to fallback from 16-QAM to QPSK modulation despite selecting or being assigned a TBS based on 16-QAM modulation based on certain conditions e.g. when repetition is used or when repetition is used and the coding rate is smaller than a threshold. Alternately, a field in the DCI may be used to indicate whether the UE is to fallback from 16-QAM to QPSK modulation despite selecting or being assigned a TBS based on 16-QAM modulation. If the RRC parameter modulation-restriction-Repetitions is not configured in the RRC message or is set to "disabled," the UE and the base station communicate data by using 16-QAM and the repetition.

The above described improved techniques can, in some implementations, be applied to uplink data (UL) transmission, either alone or in conjunction with downlink (DL) transmission. In this case, the UE is configured to transmit data over a narrowband physical uplink shared channel (NPUSCH) using QPSK upon receiving the corresponding or equivalent configuration and indication for UL transmission.

Advantageously, modulation with QPSK is less sensitive to noise and channel estimation error. Accordingly, using QPSK modulation may have a higher throughput than modulation with 16-QAM under certain conditions.

Figure 2:
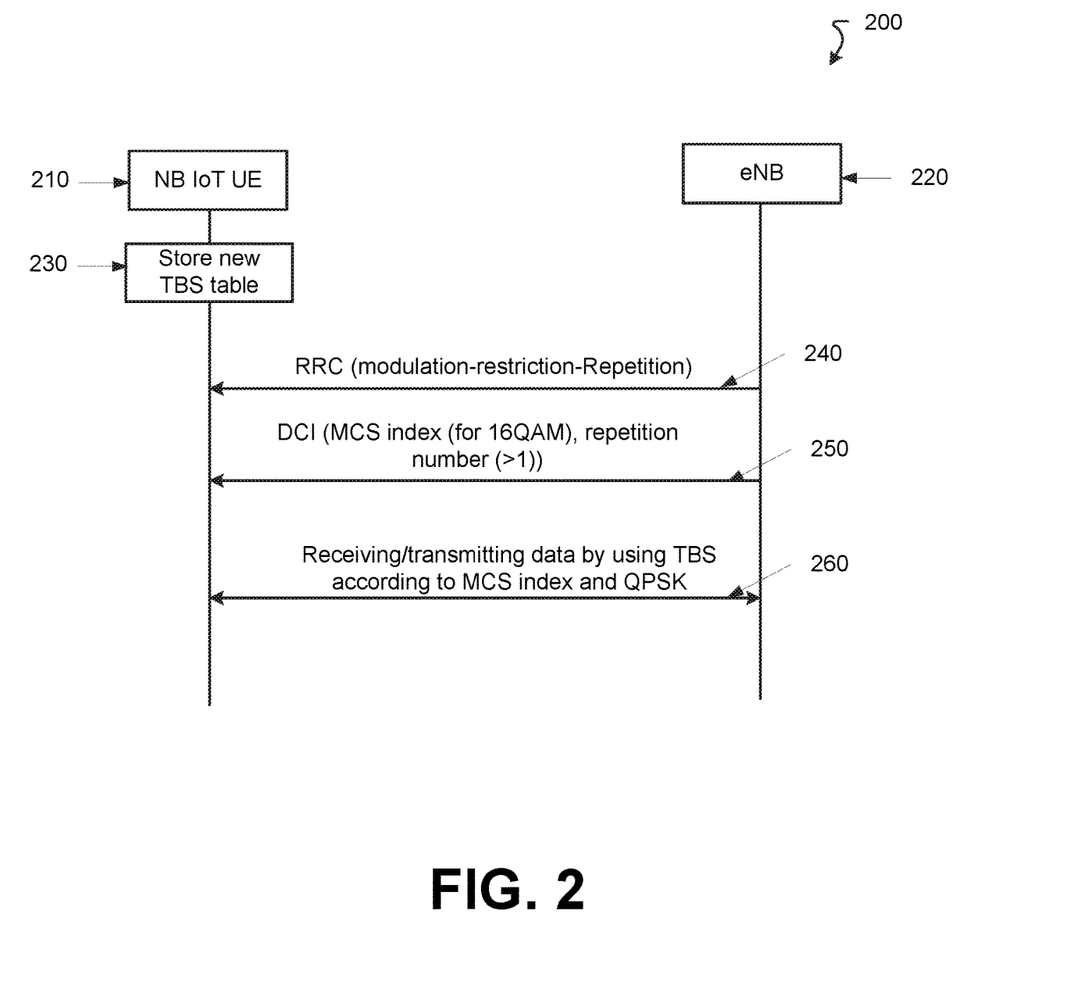
FIG. 2 is a sequence diagram illustrating an adjustment of a modulation of a data communication to QPSK according to an example implementation.

FIG. 2 is a sequence diagram illustrating an adjustment 200 of a modulation of a data communication between a NB-IoT UE 210 and a base station (an eNB or a gNB) 220 to using QPSK in place of 16-QAM. Hereinafter, the NB-IoT UE 210 may be simply called UE.

At 230, the UE 210 stores a new TBS table, e.g., a table as in Table 1 above. With the introduction of 16-QAM modulation, there may be an increase in the maximum TBS approximately on the order of 2×. In this case, a maximum TBS value of 4968 bits can be used in one example. This value was chosen using a legacy LTE MCS table based on the column entries corresponding to the current $I_{SF}$=7 column. Note that the maximum coding rate is ~0.83 in this case. In some implementations, the new maximum TBS value may be applicable to UEs that support either 1 or 2 hybrid automatic repeat request (HARQ) processes. Extending the table as in Table 1 shown above involves, in some implementations, modifying an MCS field in the DCI with an increase of one bit (to five bits) in order to increase the number of rows in the TBS table to a number that is able to accommodate 16-QAM modulation. This preserves the full scheduling flexibility for UEs that have been configured with 16-QAM. Furthermore, this DCI would only be used in the UE-specific search space (USS) since transmission in the common search space (CSS) would also apply to a UE that does not support this feature.

At 240, the eNB 220 sends to the UE 210 RRC configuration data specifying 16-QAM modulation with or without repetition, corresponding to RRC parameter modulation-restriction-Repetitions via the PDSCH. As stated above, in some implementations, the RRC parameter modulation-restriction-Repetitions indicates whether fallback is used or not.

At 250, the eNB 220 sends to the UE 210 a DCI, including (i) an MCS index field corresponding to 16-QAM modulation, and (ii) a repetition number field indicating a repetition number that is greater than one. If modulation-restriction-Repetitions is indicated in the RRC, then such DCI would cause the UE to determine the TBS according to the assigned TBS index value—which corresponds to 16-QAM modulation—but will use QPSK modulation instead of 16-QAM modulation. The coded bits are rate matched to the originally allocated resources, resulting in a higher coding rate.

Alternatively, in case the grant free scheduling method is used, the MCS index field and the repetition number field can be sent via an RRC configuration (or at 240).

At 260, the UE receives data over NPDSCH based on the MCS index indicated in the DCI. As stated above, however, for the case outlined here, the transmission and reception over NPDSCH modulated using QPSK rather than 16-QAM with repetition according to the repetition field. In some implementations, the UE also transmits data over NPUSCH with the TBS index corresponding to 16-QAM but modulated using QPSK with repetition and rate matched to allocated resources.

Figure 3:
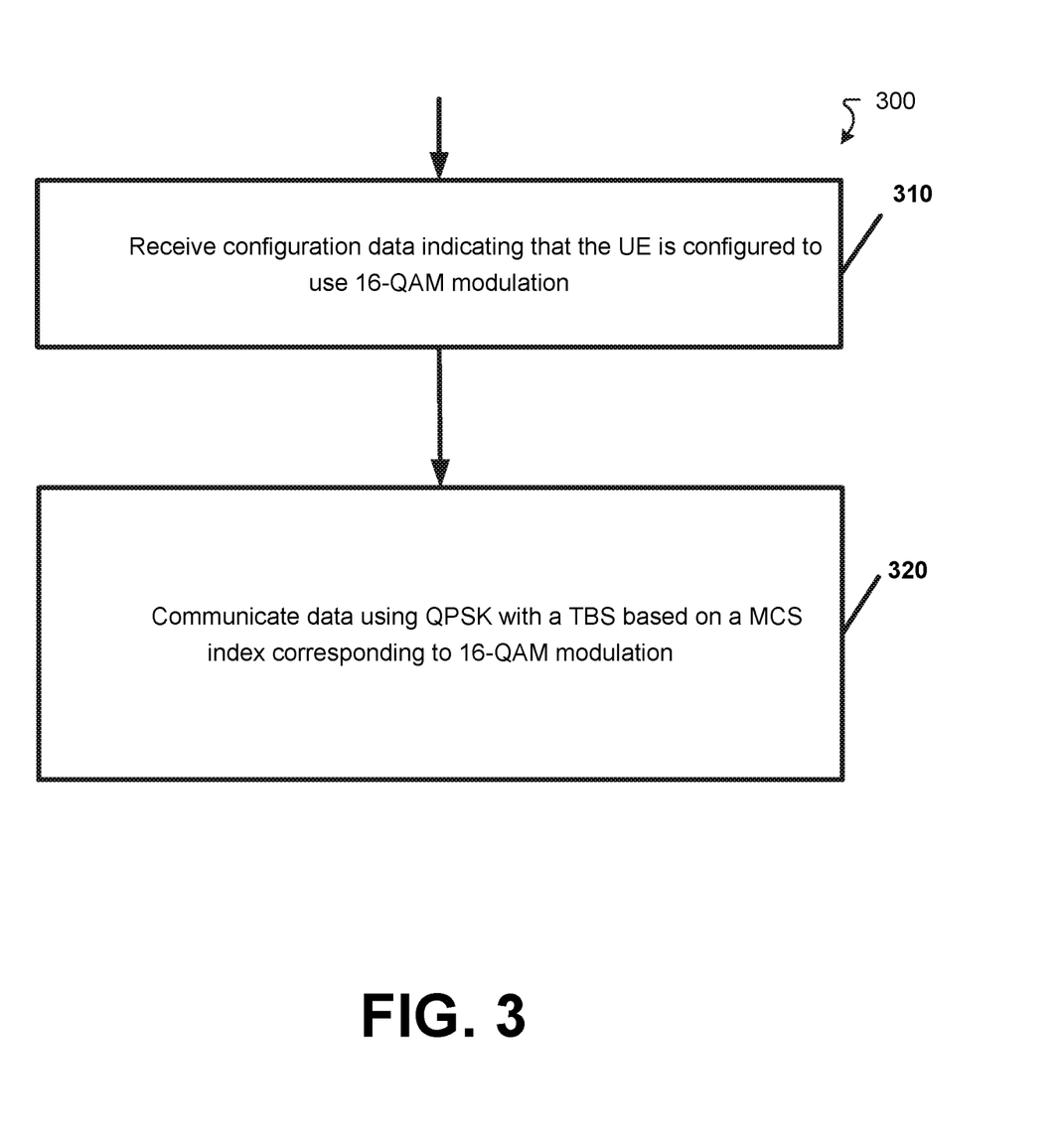
FIG. 3 is a flow chart illustrating a process of adjusting the modulation of a data communication to QPSK according to an example implementation.

Example 1-1: FIG. 3 is a flow chart illustrating an example method 300 of performing the improved techniques. Operation 310 includes receiving, by a user equipment (UE), configuration data indicating that the UE is configured to use 16-QAM modulation. Operation 320 includes communicating, by the UE (e.g. transmitting and/or receiving by the UE), data with repetition over a physical shared channel using a quadrature phase-shift keying (QPSK) modulation with a transport block size (TBS) selected from a TBS table based on an indicated modulation and coding scheme (MCS) index corresponding to 16-QAM modulation.

Example 1-2: According to an example implementation of example 1-1, wherein the configuration data is received in a downlink via radio resource control (RRC) signaling. Alternatively, an indication that the UE is configured to use 16-QAM modulation is included in RRC parameters in case the grant free scheduling is used. In this case, the indication is corresponding to the MCS field. Besides, the indication also indicates a repetition number of the data to be repeated.

Example 1-3: According to an example implementation of example 1-1, wherein the MCS index is indicated in downlink control information (DCI). In some implementations, in response to the DCI indicating 16-QAM with repetition, QPSK modulation is used to transmit the data over the NPUSCH.

Example 1-4: According to an example implementation of example 1-3, wherein in response to the DCI indicating 16-QAM with repetition, QPSK modulation is used to receive or transmit the data over the physical shared channel.

Example 1-5: According to an example implementation of example 1-3, wherein in response to the DCI indicating 16-QAM with repetition and an effective coding rate being smaller than a threshold, QPSK modulation is used to receive or transmit the data over the physical shared channel. The physical shared channel may be a narrowband physical downlink shared channel (NPDSCH) or a narrowband physical uplink shared channel (NPUSCH).

Example 1-6: According to an example implementation of example 1-5, wherein in response to the UE receiving downlink control information (DCI), the DCI including (i) a modulation and coding scheme (MCS) field indicating 16-QAM modulation and (ii) a repetition number field indicating a repetition number of the data being greater than one, the TBS is based on a TBS index corresponding to the MCS field and a subframe (SF) index and QPSK modulation is used to receive or transmit the data over the repeated physical shared channel. In the case, the method may further comprise determining, by the UE, a number of coded bits for rate matching based on the TBS index and SF index, and wherein QPSK modulation is used to receive the data over the repeated physical shared channel. In addition, the DCI may also indicate whether QPSK modulation is used to receive or transmit the data over the repeated NPDSCH or NPUSCH. In some implementations, the DCI explicitly indicates whether the UE will fall back to QPSK.

Example 1-7: According to an example implementation of example 1-1, wherein communicating includes at least one of transmitting, by the UE, the data to the base station or receiving, by the UE, the data from the base station.

Example 1-8: According to an example implementation of example 1-1, wherein the physical shared channel is a narrowband physical shared channel.

Example 1-9: According to an example implementation of example 1-1, wherein the configuration data further indicates whether repetition can be used with 16-QAM modulation.

Example 1-10: An apparatus comprising means for performing a method of any of examples 1-1 to 1-9.

Example 1-11: A computer program product including a non-transitory computer-readable storage medium and storing executable code that, when executed by at least one data processing apparatus, is configured to cause the at least one data processing apparatus to perform a method of any of examples 1-1 to 1-9.

Figure 4:
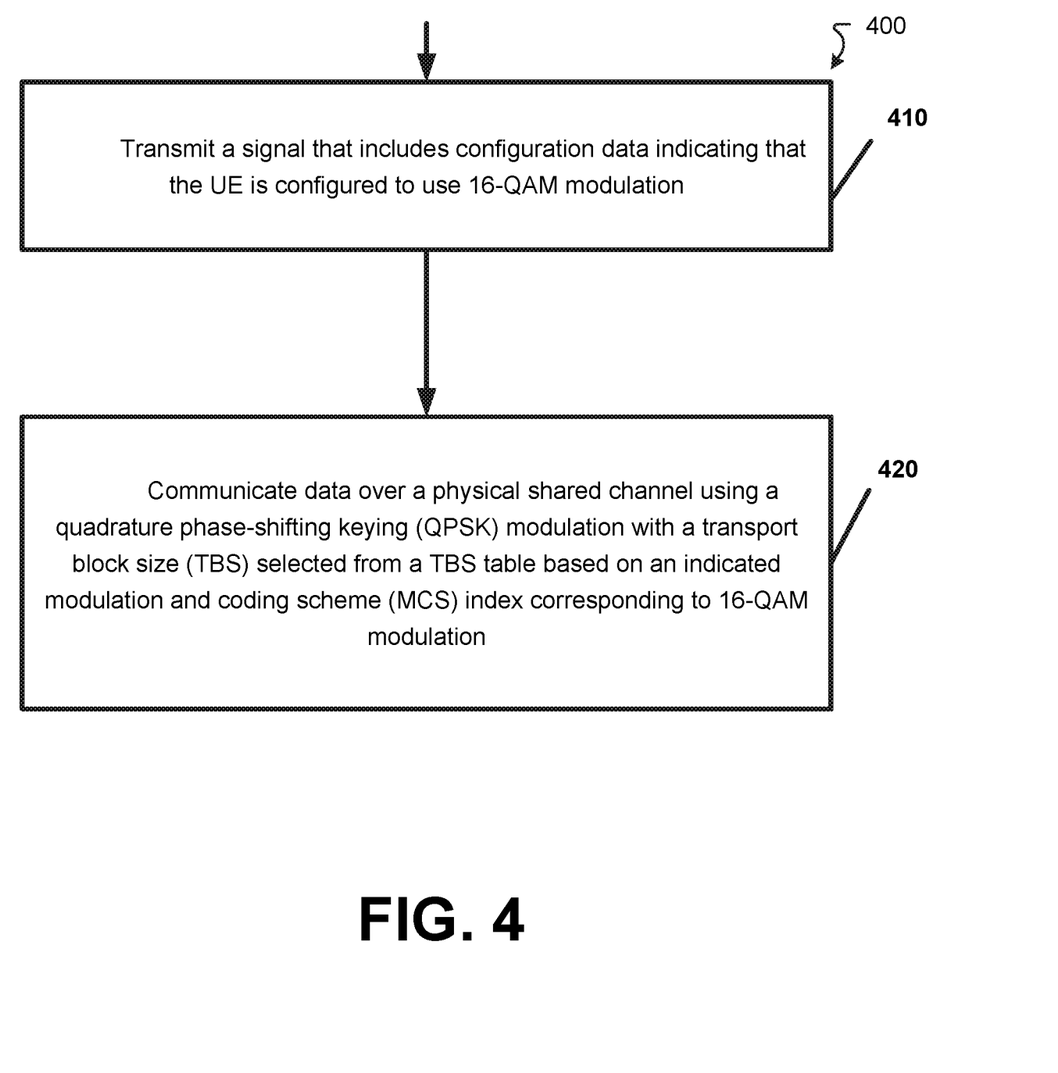
FIG. 4 is a diagram illustrating a process of adjusting the modulation of a data communication to QPSK according to an example implementation.

Example 2-1: FIG. 4 is a flow chart illustrating an example method 400 of performing the improved techniques. Operation 410 includes transmitting, by a base station (eNB or gNB), configuration data indicating that the UE is configured to use 16-QAM modulation. Operation 420 includes communicating, by the base station, data over a physical shared channel using a quadrature phase-shift keying (QPSK) modulation with a transport block size (TBS) selected from a TBS table based on an indicated modulation and coding scheme (MCS) index corresponding to 16-QAM modulation.

Example 2-2: According to an example implementation of example 2-1, further comprises receiving, by a base station, a capability signal from a user equipment (UE) indicating that the UE is capable of supporting 16-QAM modulation on a physical shared channel, and the transmitting of the configuration data is performed in response to receiving the capability signal.

Example 2-3: According to an example implementation of example 2-1, wherein the configuration data further indicates whether repetition for the data can be used with 16-QAM modulation.

Example 2-4: According to an example implementation of example 2-1, wherein the configuration data is transmitted by using a radio resource control (RRC) signal.

Example 2-5: According to an example implementation of example 2-1, wherein the MCS index is indicated in downlink control information (DCI). Alternatively, in case the grant free scheduling is used, the MCS field and a repetition number field can be transmitted through the RRC configuration instead of the DCI.

Example 2-6: According to an example implementation of example 2-1, wherein communicating includes at least one of transmitting, by the base station, the data to the UE or receiving, by the base station, the data from the UE.

Example 2-7: According to an example implementation of example 2-1, wherein the physical shared channel is a narrowband physical shared channel. The physical shared channel may be a narrowband physical downlink shared channel (NPDSCH) or a narrowband physical uplink shared channel (NPUSCH).

Example 2-8: An apparatus comprising means for performing a method of any of examples 2-1 to 2-7.

Example 2-9: A computer program product including a non-transitory computer-readable storage medium and storing executable code that, when executed by at least one data processing apparatus, is configured to cause the at least one data processing apparatus to perform a method of any of examples 2-1 to 2-7.

Figure 5:
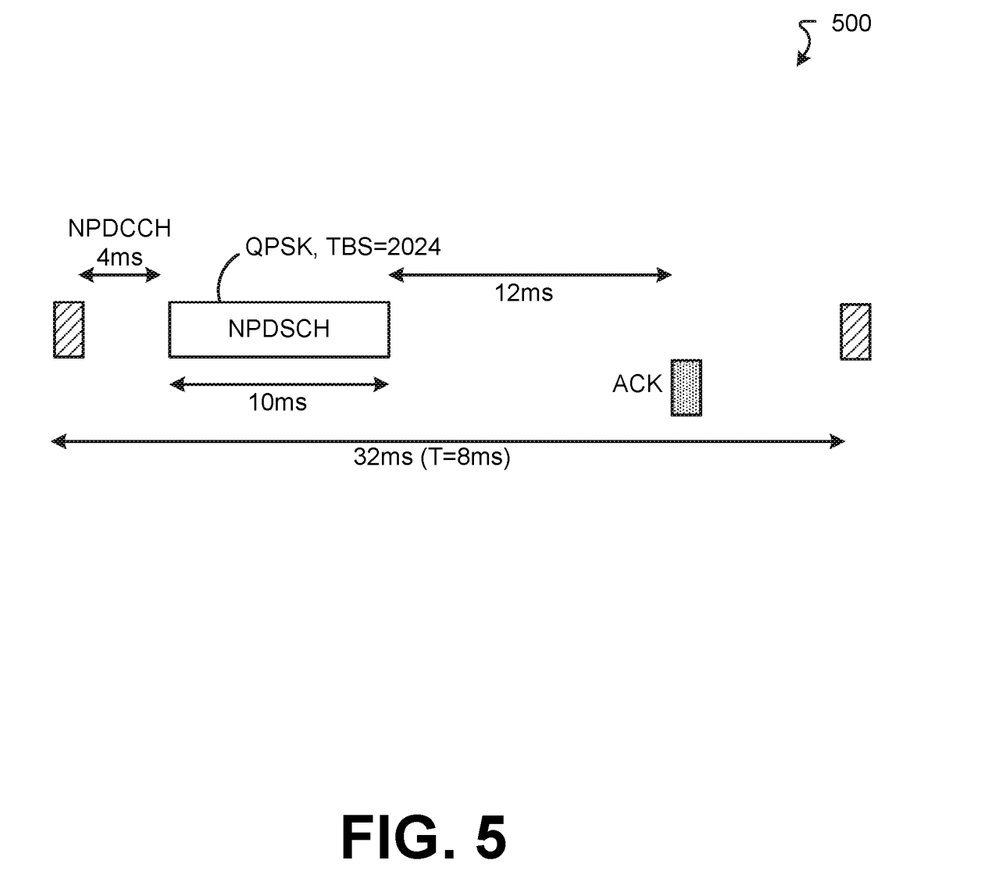
FIG. 5 is a diagram illustrating a throughput calculation for NB-IoT UE according to an example implementation.

FIG. 5 is a diagram illustrating a throughput calculation 500 for NB-IoT UE. It is assumed that the UE radio channel condition can only support I_TBS=11 (QPSK, R=0.7). From the MCS table (i.e., Table 1), the eNB can schedule UE using I_TBS=11 and I_SF=7, resulting in TBS=2024 bits. Accordingly, FIG. 5 shows the throughput calculation using TBS=2024. In FIG. 5, the processing time the UE takes between a narrowband physical downlink control channel (NPDCCH) and the non-repeating NPDSCH is 4 ms, the NPDSCH transmission duration is 10 ms, the time between the NPDSCH and an acknowledgment (ACK, in HARQ protocols) is 12 ms; the total UE processing time is 32 ms. In this case, QPSK modulation is used because the TBS index indicates a TBS not configured for 16-QAM. The throughput is 2024 bits/32 ms=63.3 kbps.

Figure 6:
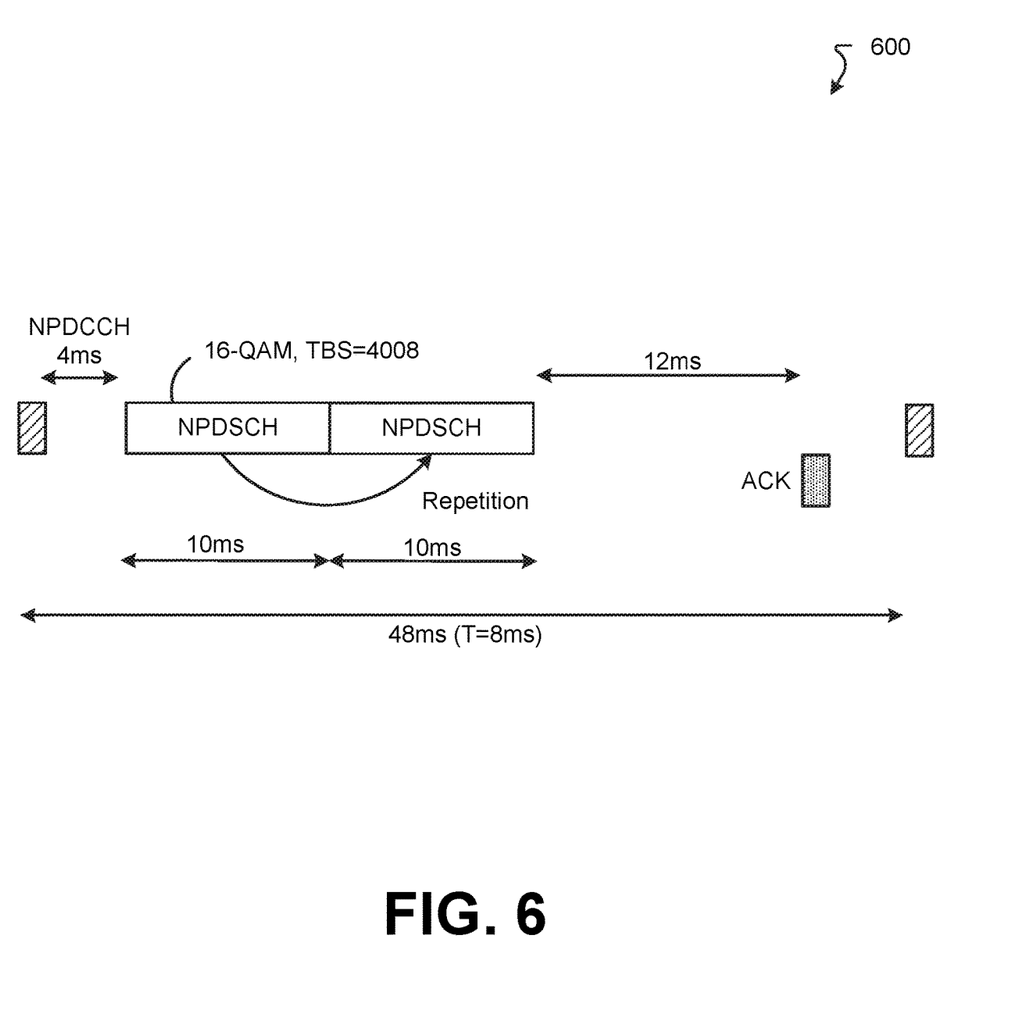
FIG. 6 is a diagram illustrating a throughput calculation for NB-IoT UE according to an example implementation.

FIG. 6 is another diagram illustrating a throughput calculation 600 for NB-IoT UE. In the downlink, TBS greater than 2536 bits is supported using 16-QAM modulation. In some cases, however, the SNR cannot support 16-QAM. In this case, advantage may be taken of the higher supported TBS by scheduling 16-QAM with repetition. This is shown in FIG. 6 where I_TBS=18 is used with I_SF=7 and 2 repetitions. The throughput is 4008 bits/48 ms=83.5 kbps, an improvement of 32% of Rel-16 data rate for this particular SNR level shown in FIG. 5.

Figure 7:
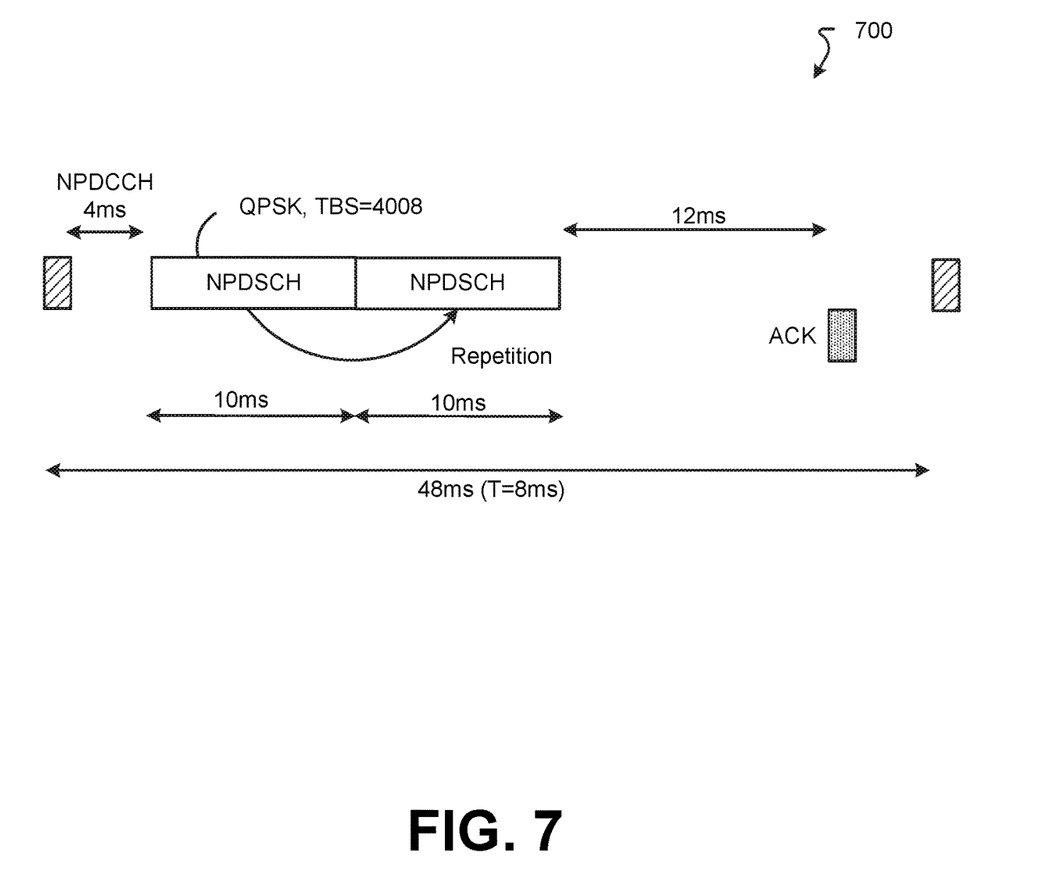
FIG. 7 is a diagram illustrating a throughput calculation for NB-IoT UE according to an example implementation.

FIG. 7 is another diagram illustrating a throughput calculation 700 for NB-IoT UE. In practice, using 16-QAM results in worse performance than using QPSK with higher coding rate due to the higher sensitivity of 16-QAM to noise and channel estimation error. Typically, QPSK requires ~1 dB less than 16-QAM for the same spectral efficiency. For example, at 10% block error rate (BLER), QPSK R=⅔ requires 3.6 dB while 16-QAM R=⅓ requires 4.4 dB in AWGN channel. Therefore, it would improve performance if we schedule using 16-QAM but the modulation is adjusted to QPSK as shown in FIG. 7. In this case, the data rate is the same but using QPSK requires ~1 dB less, so (1) performance improves for users with good enough SNR (i.e. lower BLER for the SNR) and (2) more users can enjoy this higher data rate (i.e. users with lower SNR can be scheduled).

In some implementations, the redundancy version is cycled between RV0 and RV2 in successive repetitions. Conventional NB-IoT supports only RV0 in the NPDSCH. However, NB-IoT also supports RV0 and RV2 in NPUSCH together with RV cycling. In this case, changes to the specification and implementation to support this are expected to be small.

In some implementations, depending on the final design of the MCS table, 16-QAM modulation with repetition is used instead of QPSK. For example, if the effective coding rate of QPSK modulation is too high, i.e., greater than a threshold.

In some implementations, the UE is configured to use 16-QAM modulation instead of QPSK modulation when modulation-restriction-Repetitions is configured and the UE is assigned a certain 16-QAM TBS index value with repetition. The I_TBS values may be specified in the specification (e.g., I_TBS={20, 21}). For example, with I_TBS=21, I_SF=7 and 2 repetitions, the effective coding rate is 0.4312 with 16-QAM. If QPSK modulation is used instead of 16-QAM modulation, the effective coding rate is 0.8625. This effective coding rate may be too high and accordingly QPSK modulation would not be used in such a scenario.

In some implementations, the UE uses 16-QAM modulation instead of QPSK modulation when modulation-restriction-Repetitions is configured and the UE is assigned a 16-QAM TBS index value with repetition, where the effective coding rate with 16-QAM at the assigned TBS index value is greater than a threshold (e.g. 0.45).

In some implementations, some I_TBS values are not feasible for certain NB-IoT in-band deployment mode since this mode has a smaller number of OFDM symbols (due to LTE PDCCH). This small number of OFDM symbols may make the coding rate too high to use QPSK modulation.

In some implementations, TBS index values={11, 12, 13} are not valid in in-band deployment mode due to a smaller number of OFDM symbols, as this would make the coding rate too high. Similarly, TBS index values={19, 20, 21} would not be a valid in in-band deployment for 16-QAM modulation.

In some implementations, for in-band deployment mode, the UE will use 16-QAM modulation instead of QPSK modulation when modulation-restriction-Repetitions is not configured, and the UE is assigned a certain 16-QAM TBS index value with repetition. The TBS index values for this exception may be specified (e.g. TBS index={17, 18}).

In some implementations, the UE uses 16-QAM modulation instead of QPSK modulation when modulation-restriction-Repetitions is configured and the UE is assigned a 16-QAM TBS index value with repetition where the effective coding rate with 16-QAM modulation of the assigned TBS index value is higher than a threshold (e.g. 0.45).

It is understood that if the UE is not configured with modulation-restriction-Repetitions then eNB/UE will proceed using the 16-QAM modulation.

Figure 8:
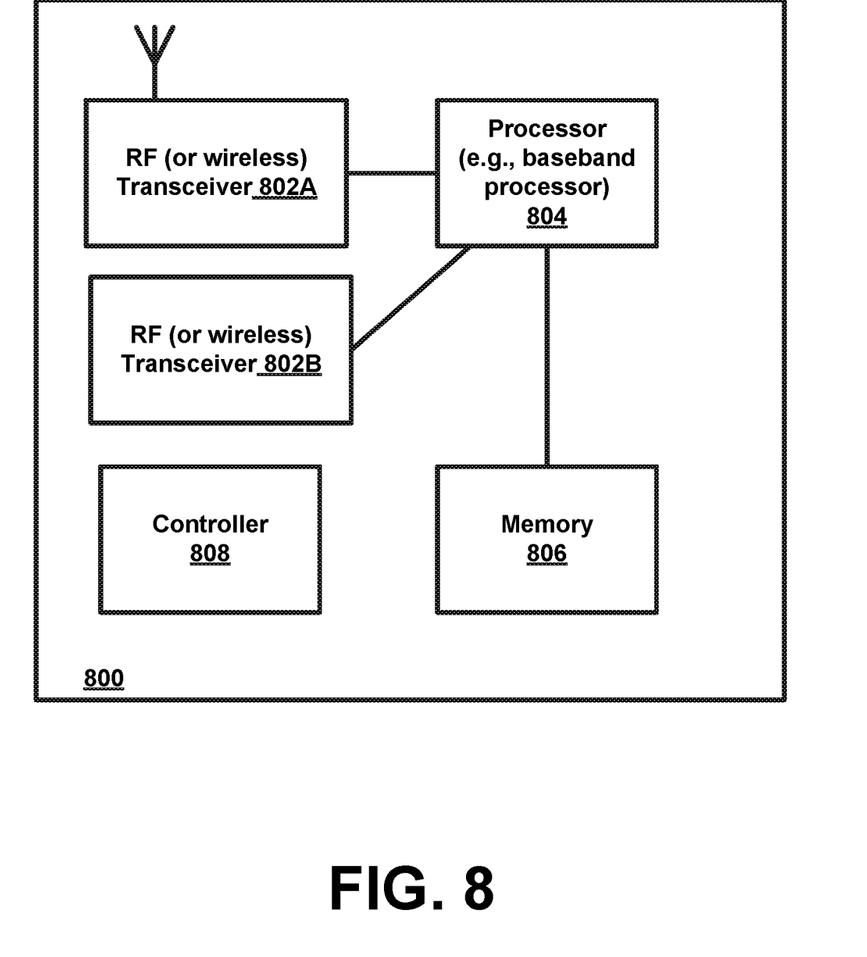
FIG. 8 is a block diagram of a node or wireless station (e.g., base station/access point, relay node, or mobile station/user device) according to an example implementation

List of example abbreviations:
3GPP 3rd generation project partner
LTE Long term evolution
MTC Machine type communication
NB-IoT Narrow band-internet of things
CE Coverage enhanced
eNB enhanced Node-B
UE User equipment
DL Downlink
UL Uplink
RRC Radio resource control
PRB Physical resource block
PDSCH Physical downlink sharing channel
NPDSCH Narrow band PDSCH
DCI Downlink control information
PDCCH Physical downlink control channel
NPDCCH Narrow band PDCCH
NPRACH Narrow band PRACH FIG. 8 is a block diagram of a wireless station (e.g., AP, BS, e/gNB, NB-IoT UE, UE or user device) 800 according to an example implementation. The wireless station 800 may include, for example, one or two RF (radio frequency) or wireless transceivers 802A, 802B, where each wireless transceiver includes a transmitter to transmit signals (or data) and a receiver to receive signals (or data). The wireless station also includes a processor or control unit/entity (controller) 804 to execute instructions or software and control transmission and receptions of signals, and a memory 806 to store data and/or instructions.

Processor 804 may also make decisions or determinations, generate slots, subframes, packets or messages for transmission, decode received slots, subframes, packets or messages for further processing, and other tasks or functions described herein. Processor 804, which may be a baseband processor, for example, may generate messages, packets, frames or other signals for transmission via wireless transceiver 802 (802A or 802B). Processor 804 may control transmission of signals or messages over a wireless network, and may control the reception of signals or messages, etc., via a wireless network (e.g., after being down-converted by wireless transceiver 802, for example). Processor 804 may be programmable and capable of executing software or other instructions stored in memory or on other computer media to perform the various tasks and functions described above, such as one or more of the tasks or methods described above. Processor 804 may be (or may include), for example, hardware, programmable logic, a programmable processor that executes software or firmware, and/or any combination of these. Using other terminology, processor 804 and transceiver 802 together may be considered as a wireless transmitter/receiver system, for example.

In addition, referring to FIG. 8, a controller (or processor) 808 may execute software and instructions, and may provide overall control for the station 800, and may provide control for other systems not shown in FIG. 8, such as controlling input/output devices (e.g., display, keypad), and/or may execute software for one or more applications that may be provided on wireless station 800, such as, for example, an email program, audio/video applications, a word processor, a Voice over IP application, or other application or software.

In addition, a storage medium may be provided that includes stored instructions, which when executed by a controller or processor may result in the processor 804, or other controller or processor, performing one or more of the functions or tasks described above.

According to another example implementation, RF or wireless transceiver(s) 802A/802B may receive signals or data and/or transmit or send signals or data. Processor 804 (and possibly transceivers 802A/802B) may control the RF or wireless transceiver 802A or 802B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method, comprising:
receiving, by a user equipment (UE), configuration data indicating that the UE is configured to use 16-quadrature amplitude modulation (QAM) modulation; and
communicating, by the UE, data over a physical shared channel using a transport block size (TBS) selected from a TBS table based on an indicated modulation and coding scheme (MCS) index corresponding to the 16-QAM modulation,
wherein the MCS index is indicated in downlink control information (DCI), and
wherein in response to the DCI indicating 16-QAM with repetition and an effective coding rate being smaller than a threshold, a quadrature phase-shift keying (QPSK) modulation is used to receive or transmit the data over the physical shared channel.

2. The method as in claim 1, wherein the configuration data is received in a downlink via radio resource control (RRC) signalling, and wherein an indication that the UE is configured to use 16-QAM modulation is included in RRC parameters.

3. The method as in claim 1, wherein the physical shared channel is a narrowband physical shared channel.

4. An apparatus, comprising:
at least one processor; and
at least one memory including computer program code;
the at least one memory and the computer program code configured to, with the at least one processor, cause the apparatus at least to:
receive configuration data indicating that the apparatus is configured to use 16-quadrature amplitude modulation (QAM) modulation; and
communicate data over a physical shared channel using a transport block size (TBS) selected from a TBS table based on an indicated modulation and coding scheme (MCS) index corresponding to the 16-QAM modulation,
wherein the MCS index is indicated in downlink control information (DCI), and
wherein in response to the DCI indicating 16-QAM with repetition and an effective coding rate being smaller than a threshold, a quadrature phase-shift keying (QPSK) modulation is used to receive or transmit the data over the physical shared channel.

5. The apparatus as in claim 4, wherein the configuration data is received in a downlink via apparatus capability signalling, and wherein an indication that the apparatus is configured to use 16-QAM modulation is included in radio resource control (RRC) parameters.

6. The apparatus as in claim 4, wherein in response to the apparatus receiving downlink control information (DCI), the DCI including (i) a modulation and coding scheme (MCS) indicating 16-QAM modulation and (ii) a repetition number field indicating a repetition number of the physical shared channel being greater than one, the TBS is based on a TBS index and a subframe (SF) index indicated by the MCS and QPSK modulation is used to receive or transmit the content data over the repeated physical shared channel;
wherein the at least one memory and the computer program code are further configured to, with the at least one processor, cause the apparatus at least to:
determine, by the apparatus, a number of coded bits for rate matching based on the TBS index and SF index, and
wherein QPSK modulation is used to receive or transmit the data over the repeated physical shared channel.

7. The apparatus as in claim 4, wherein the physical shared channel is a narrowband physical shared channel.

8. An apparatus, comprising:
at least one processor; and
at least one memory including computer program code;
the at least one memory and the computer program code configured to, with the at least one processor, cause the apparatus at least to:
transmit to a user equipment (UE) configuration data indicating that the UE is configured to use 16-quadrature amplitude modulation (QAM) modulation, and
communicate data over a physical shared channel using a transport block size (TBS) selected from a TBS table based on an indicated modulation and coding scheme (MCS) index corresponding to the 16-QAM modulation,
wherein the MCS index is indicated in downlink control information (DCI), and
wherein in response to the DCI indicating 16-QAM with repetition and an effective coding rate being smaller than a threshold, a quadrature phase-shift keying (QPSK) modulation is used to receive or transmit the data over the physical shared channel.

9. The apparatus as in claim 8, wherein the at least one memory and the computer program code are further configured to, with the at least one processor, cause the apparatus at least to:
receive a capability signal from the UE indicating that the UE is capable of supporting 16-QAM modulation on a physical shared channel, the transmitting of the configuration data being performed in response to receiving the capability signal.

10. The apparatus as in claim 8, wherein the configuration data further indicates whether repetition can be used with 16-QAM modulation.

11. The apparatus as in claim 8, wherein the configuration data is transmitted by using a radio resource control (RRC) signal.

12. The apparatus as in claim 8, wherein communicating includes at least one of transmitting, by the base station, the data to the UE or receiving, by the base station, the data from the UE.

* * * * *